Patented Dec. 3, 1935

2,023,075

UNITED STATES PATENT OFFICE 2,023,075

NITROGEN CONTAINING ESTERS

Benjamin R. Harris, Chicago, Ill.

No Drawing. Application January 11, 1934,
Serial No. 706,291

45 Claims. (Cl. 260—25)

My invention relates to a new class of chemical substances. It relates more in particular to a class of chemical substances having the properties of interface modifiers when employed in a treating bath.

The object of my invention is the provision of a new class of chemical substances.

Another object is the provision of a class of chemical substances adapted for use as interface modifiers.

Still another object is the provision of a treating bath employing the new interface modifiers of my invention.

The class of substances of my invention has many useful applications in the arts where frothing, wetting, penetrating, detergent, emulsifying and other interface modifying functions are required. I may use them in a treating bath which contains aqueous media such as water and reagents to treat textile fabrics, leather or ores. The reagents are a class of substances such as Na$_2$CO$_3$ and other alkalis and soaps to scour wool, dyes for textiles, color discharging agents such as Na sulphoxilate and sulphites, oil and sulphonated oils, castor oil, sulfonated fish oils for stuffing leather, fatty acids such as oleic acid and H$_2$SO$_4$ for ore separation and other reagents which react on surfaces or at interfaces of textiles, leather, fabrics, ores and the like.

The substances of my invention are in general possessed of at least two groups, one having a hydrophile function and the other having a lipophile function in the molecule. The hydrophile function is performed primarily by a nitrogenous group, in the form of a quaternary ammonium radical, specifically a betaine halide radical. The lipophile group is a group having a definite affinity for oils and fats and comprises either an ankyl, ether, or ester group linked to the betaine halide. The ester group is in general a mono- or di-fatty acid ester of a polyhydroxy substance wherein another hydroxy group of the polyhydroxy substance is esterified with the carboxylic group of the betaine.

The compounds of my invention may be represented by the formula

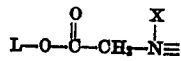

wherein "L" is a lipophile group with at least four carbon atoms in the form of either an alkyl, ether or ester radical; the remaining portion of the molecule represents a betaine radical, "X" is an anion, such as Cl$^-$, Br$^-$, I$^-$, NO$_3^-$, OH$^-$, SO$_4^-$, acetate or some other convenient organic or inorganic anion, and "N" is a pentavalent nitrogen whose three indicated valence bonds are satisfied by alkyl, aryl, or cyclic radicals.

Irrespective of differences of composition or structure, all of the substances of my invention have this much in common in that all of them comprise the radical

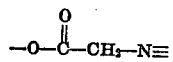

It is at once apparent from a consideration of the above general formula that the compounds of my invention are betaine esters wherein the quaternary ammonium radical is the hydrophile group and performs the principal hydrophile function in the molecule, while the remaining part of the molecule comprises a lipophile group, which performs the lipophile function in the molecule. The concept that certain interface modifying agents perform their role by orientating themselves at the water-oil interface or at water-air interface, or at interfaces of other materials in which my substances are used as aids in treating baths to promote penetration and surface action in connection with dyeing, bleaching, scouring of textiles, fabrics, leather, and ore separation, is apparently satisfied by the structure of the compounds of my present invention.

The following are examples of compounds coming within the class of substances of my invention:

(1) Cholesteryl ester of betaine chloride (Carbocholesteroxy) methyl trimethylammonium chloride.

(2) 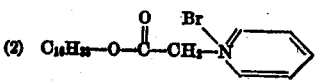 (Carbopalmitoxy) methyl pyridinium bromide.

(3) Melissyl ester of betaine bromide (4) C₂₇H₄₅—O—C(=O)—CH₂—N⁺(Br⁻)(pyridine)  (Carbocholesteroxy) methyl pyridinium bromide (5) C₂₇H₄₅—O—C(=O)—CH₂—N⁺(Br⁻)(CH₃)(CH₃)(C₆H₅)  (Carbocholesteroxy) methyl dimethylphenylammonium bromide (6) C₂₇H₄₅—O—C(=O)—CH₂—N⁺(Br⁻)(CH₃)(quinaldine)  (Carbocholesteroxy) methyl quinaldinium bromide (7) Cetyl ester of betaine chloride (8) Octyl ester of betaine bromide (9) H₂C—O—C(=O)—C₁₇H₃₅ / H—C—OH / H₂C—O—C(=O)—CH₂—N⁺(Cl⁻)(C₂H₅)(CH₃)(CH₃)

(10) C₆H₁₃—O—C(=O)—CH₂—N⁺(Cl⁻)(decahydronaphthyl)

(11) C₁₇H₃₅—C(=O)—O—CH₂ / C₁₇H₃₅—C(=O)—O—CH / H—C—O—C(=O)—CH₂—N⁺(Cl⁻)(CH₃)₃

(12) C₈H₁₇—O—C(=O)—CH₂—N⁺(Cl⁻)(CH₃)₃

(13) C₁₇H₃₅—C(=O)—O—CH₂—CH₂—O—C(=O)—CH₂—N⁺(Br⁻)(C₂H₅)₃

(14) C₁₁H₂₃—C(=O)—O—CH₂—CH₂—O—CH₂—CH₂—O—C(=O)—CH₂—N⁺(Cl⁻)(piperidine)

(15) C₁₆H₃₃—C(=O)—O—CH₂—CH(OH)—CH₂—O—CH₂—CH(OH)—CH₂—O—C(=O)—CH₂—N⁺(Cl⁻)(CH₃)(quinaldinium)

(16) C₈H₁₇—O—C(=O)—CH₂—N⁺(Cl⁻)(CH₃)₃

(17) C₁₇H₃₅—C(=O)—O—CH₂—CH(OH)—CH₂—O—C(=O)—CH₂—N⁺(Cl⁻)(CH₃)₃

(18) Dodecyl ester of betaine chloride
(19) Cholesteryl ester of betaine bromide
(20) Melissyl ester of betaine chloride.

(21) H₂C—O—C(=O)—C₁₇H₃₅ / HC—O—C(=O)—CH₂—N⁺(Cl⁻)(pyridine) / H₂C—O—C(=O)—CH₂—N⁺(Cl⁻)(pyridine)

(22) C₈H₁₇—O—CH₂—CH₂—O—C(=O)—CH₂—N⁺(Cl⁻)(CH₃)₃

(23) C₁₆H₃₃—O—CH₂—CH₂—O—CH₂—CH₂—O—C(=O)—CH₂—N⁺(Br⁻)(CH₃)(decahydroquinolinium)

(24) H₂C—O—C₄H₉ / H—C—O—C(=O)—CH₂—N⁺(Cl⁻)(pyridine) / H₂C—O—C₄H₉

(25) H₂C—O—C(=O)—C₁₇H₃₅ / H—C—O—C(=O)—CH₂—N⁺(Cl⁻)(CH₃)₃ / H₂C—O—C(=O)—CH₂—N⁺(Cl⁻)(CH₃)₃

(26) C₁₇H₃₅—C(=O)—O—CH₂—CH(OH)—CH₂—O—C(=O)—CH₂—N⁺(Cl⁻)(pyridine)

(27) C₁₇H₃₅—C(=O)—O—CH₂—CH₂—O—C(=O)—CH₂—N⁺(Cl⁻)(CH₃)₃

(28) C₁₇H₃₅—C(=O)—O—CH₂ / H—C—O—C(=O)—CH₂—N⁺(Cl⁻)(pyridine) / C₁₇H₃₅—C(=O)—O—CH₂

The numbers used are for the purpose of simplifying reference to and identification of the compounds, and do not indicate any characteristic of the substances.

From the above examples, the general structure of the compounds of my invention will at once be more apparent. In each case, the betaine radical comprises the hydrophile group of the molecule, in which one of the bonds of the nitrogen is satisfied by the radical

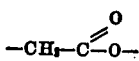

and three other nitrogen bonds are satisfied by substantially non-lipophilic organic radicals $R_1$, $R_2$, $R_3$, such as a methyl, ethyl or the like or aryl or a ring group or the like.

The lipophile group in each instance is either an alkyl, ether or an ester group. For example, in the second example hereinabove, number 2 of the list, the lipophile group is a palmityl group of the carbopalmitoxy radical. In other examples given, the lipophile group is an ester of a polyhydroxy substance such as glycerine or glycol. The alkyl lipophile group may be the radical of substantially any aliphatic alcohol having four carbon atoms or more. For example, the following alcohols may be employed as sources of the alkyl lipophile group: butyl, amyl, hexyl, octyl, dodecyl, hexadecyl, octadecyl, oleyl, ceryl, melissyl, cholesteryl, sitosteryl, phytosteryl, etc.

The "L" of the formula may also be satisfied as previously noted by an ester or ether group, such as a fatty acid ester or alkyl ether of a polyhydroxy substance. The polyhydroxy substances employed may be hydroxycarboxylic acids, sugars, alcohols, sugar alcohols, glycols, polyglycols, glycerols, polyglycerols; in fact, substantially any substance having at least two esterifiable hydroxy groups. Examples of some other polyhydroxy substances are as follows: mucic acid, tartaric acid, saccharic acid, gluconic acid, glucuronic acid, gulonic acid, mannonic acid, trihydroxyglutaric acid, glyceric acid, and the like, as well as of carboxylic oxidation products of polyglycerols such as represented by the following formula

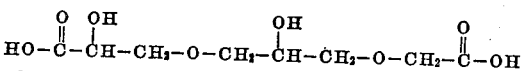

xylose, sucrose, glucose, lactose, galactose, fructose, maltose, rhamnose, sorbitol, dulcitol, arabitol and other substances having free hydroxy groups.

Examples of acids which may be employed as a source of the fatty acid lipophile radical forming a part of the lipophile ester group are as follows: caproic acid, capric, capryllic, valeric, butyric, abietic, melyssic, hydroxystearic, benzoic, benzoylbenzoic, naphthoic, toluic, palmitic acid, stearic, lauric, melissic, oleic, myristic, ricinoleic, linoleic acid or any fatty acid with at least four carbon atoms, mixed fatty acids derived from natural fats, oils, hydrogenated oils, waxes.

Examples of some of the tertiary amines which I use as a source of and for the purpose of forming the quaternary nitrogen in the betaine radicle are: pyridine, various picolines, quinoline, isoquinoline, quinaldines, dimethyl aniline, diethylaniline, triethyl amine, ethyldimethylamine, trimethylamine and other tertiary amines which are sufficiently reactive to form quaternary ammonium compounds.

In general, my preferred method of making these substances is to react a tertiary amine, either aliphatic, cyclic or mixed aliphatic-aromatic, with a lipophile ester of monobrom- or monochloracetic acid. A specific illustration of such a method is as follows:

*Example No. 1.*—I prepare the substance marked above No. 1, by the following method:

To 40 parts of cholesterol I add 12½ parts of chloracetyl chloride in benzol as a solvent, and heat under reflux at from 70 to 80 degrees centigrade until there is no more hydrochloric acid evolved. This gives the intermediary cholesteryl chloracetate. I evaporate off the benzol and then add hot water to wash out the excess chloracetyl chloride. I separate the material from the hot water, washing several times and then I evaporate off the residual benzol and dry the product to eliminate moisture.

I then dissolve 20 parts of the cholesteryl chloracetate obtained above in 200 parts of dry toluene. To this mixture or solution are added 5 parts of trimethyl amine dissolved in 15 parts of absolute methyl alcohol in a tightly closed vessel. After standing at room temperature for about two days, a colorless heavy powder, which has settled to the bottom of the vessel, is filtered off. This is the cholesteryl ester betaine chloride. It is then further purified, if desired, by washing out the excess of trimethylamine with methyl alcohol and then dried.

The resulting compound indicated by the number 1 appearing hereinabove is surprisingly hydrophillic in character despite its considerable lipophile group. It disperses readily in aqueous media and is a very potent improver of the frying characteristics of oleomargarine in that it reduces the spattering of margarine during frying, and has other important properties as an interface modifier.

I can prepare the first intermediary, namely, the cholesteryl chloracetate, by heating 40 parts of cholesterol with a large excess of chloracetic acid, approximately 100% in excess of that required to react stoichiochemically to produce the chloracetate. For example, I heat 40 parts of cholesterol with 18 to 20 parts of chloracetic acid at a temperature of 140 to 145 degrees C., with constant agitation by bubbling carbon dioxide through for about from two to three hours. The excess of chloracetic acid is then washed out with water several times and the product is then dried and reacted as above with trimethylamine in dry toluene.

Compounds Nos. 3, 7, 8, 9, 11, 12, 13, 16, 17, 18, 19, 20, 22, 25, and 27, and other substances of my invention, may be satisfactorily prepared by the above described methods, varying the amount of reagents proportionately with the molecular weights of the specific intermediary used. I can prepare my chloracetates by taking the lipin containing the hydroxy group and heating it with a large excess of chloracetic acid as shown above, or I can prepare my chloracetate derivative of the lipin by taking the lipin containing the hydroxy group and adding to it chloracetyl chloride approximately 10% in excess of that required to react stoichiometrically in a solvent such as benzol, and purify the intermediary by the method outlined above, or by any other convenient method, and then proceed with the other stage of the reaction as outlined.

In the following table, I give examples of carrying out the reaction by one method for certain compounds, indicating the compounds by the numbers which I have designated above. I do not, however, limit this invention to the specific method of preparing the above substances, as well as similar equivalent substances of my invention, but they may be varied within the skill of a synthetic organic chemist to obtain substantially the same results. For example, if I desire to obtain the betaine bromide derivative of my lipin, I use in place of chloracetyl chloride, bromacetyl bromide, in proportions approximately chemically equivalent to those outlined above.

bling an inert gas through to produce the monoolein. I separate the excess glycerine and take

| No. of compound | Amount of lipin group (in parts) | Solvent | Amount of lipin chloracetate or lipin bromacetate | Nitrogenous base |
|---|---|---|---|---|
| 1 | 40 cholesterol. <br> 12½ chloracetyl chloride. | Benzol | 20 cholesteryl chloracetate in <br> 200 toluene | 5 trimethylamine in <br> 15 absolute methyl alcohol |
| 3 | 40 melissyl alcohol. <br> 20 bromacetyl bromide. | do. | 25 melissyl bromacetate in <br> 200 toluene | 5 trimethylamine in <br> 15 absolute methyl alcohol |
| 7 | 20 cetyl alcohol. <br> 10 chloracetyl chloride. | do. | 14 cetyl chloracetate <br> 200 toluene | 5 trimethylamine in <br> 15 absolute methyl alcohol |
| 9 | 30 monomyristin. <br> 20 chloracetyl chloride. | do. | 30 monomyristin chloracetate <br> 300 toluene | 15 ethyl dimethylamine |
| 12 | 88 amyl alcohol. <br> 12½ chloracetyl chloride. | do. | 20 amyl chloracetate <br> 200 toluene | 14 trimethylamine in <br> 45 methyl alcohol |
| 13 | 33 monostearyl ethylene glycol. <br> 22 bromacetyl bromide. | do | 45 monostearyl ethylene glycol bromacetate <br> 400 toluene | 20 triethylamine |
| 16 | 130 octyl alcohol. <br> 125 chloracetyl chloride. | do. | 20 octyl chloracetate <br> 200 toluene | 12 trimethylamine in <br> 35 methyl alcohol |
| 18 | 20 dodecyl alcohol. <br> 13 chloracetyl chloride. | do. | 11 dodecyl chloracetate <br> 150 toluene | 5 trimethylamine in <br> 35 absolute methyl alcohol |
| 19 | 40 cholesterol. <br> 22 bromacetyl bromide. | do. | 22 cholesteryl bromacetate <br> 200 toluene | 5 trimethylamine in <br> 15 absolute methyl alcohol |
| 20 | 40 melissyl alcohol. <br> 12 chloracetyl chloride. | do. | 23 melissyl bromacetate <br> 200 toluene | 5 trimethylamine in <br> 15 absolute methyl alcohol |
| 22 | 16 mono-octyl ether of ethylene glycol <br> 12 chloracetyl chloride. | do. | 17 mono-octyl ether of ethylene glycol chloracetate <br> 200 toluene | 5 trimethylamine in <br> 15 absolute methyl alcohol |
| 27 | 33 mono-oleyl ethylene glycol. <br> 12½ chloracetyl chloride. | do. | 45 mono-oleyl ethylene glycol chloracetate <br> 400 toluene | 18 trimethylamine in <br> 55 absolute methyl alcohol |

The above are general directions for preparing these compounds. In view of the fact that trimethylamine is a gas which appears commercially in methyl alcohol solution, it is advisable to use it in this solvent. However, any other solvent may be used. Many of the quaternary ammonium derivatives of the betaine type, as shown above, are sparingly soluble in the solvents used and for this reason they precipitate out. In place of toluene as a solvent, as shown above, I may use some other suitable solvent. Many other methods of separation and purification may be used.

In the case of compound No. 17, I can prepare the intermediary by taking 35 parts monostearin and 20 parts of chloracetic acid, heat the mixture at a temperature of about 140 to 145 degrees C. for two or three hours, until the reaction is substantially complete, wash out the excess of chloracetic acid with hot water several times and then dry the product. Then 20 parts of monostearin chloracetate is reacted with 5 parts trimethylamine dissolved in 15 parts of absolute methyl alcohol, using about 200 parts of toluene as a solvent, reacting for two days at ordinary temperatures, and then purifying said compound by the methods shown above, or by any other similar suitable method.

Compound No. 11 can be prepared by reacting 282 parts of oleic acid with 200 parts of glycerine at 220 degrees C. for two hours, by bubbling an inert gas through to produce the mono-olein. I separate the excess glycerine and take 350 parts of my mono-olein and react it at high temperatures, about 220 to 230 degrees C. with 280 parts of oleic acid, until practically all of the oleic acid goes into the reaction to produce the diolein. During the reaction the product is stirred by bubbling an inert gas through, such as carbon dioxide. I then take 45 parts of my di-olein and heat it with 15 parts of chloracetic acid at a temperature of about 135 to 145 degrees C., passing carbon dioxide gas through again, to produce the diolein chloracetate. I eliminate the excess chloracetic acid by the method shown above, or by any other suitable method, and then I take 40 parts of the dry diolein chloracetate and react it in a solvent, such as 400 parts of toluene, with 5½ parts of trimethylamine dissolved in 15 parts of absolute methyl alcohol for about two days. I separate the compound and purify by one of the methods discussed hereinabove.

Another convenient procedure for the preparation of the new substances of my invention is to treat the lipophile material comprising an esterifiable free hydroxy group, such as for example cholesterol, dissolved or suspended in an excess of dry pyridine or any other tertiary amine, which will be shown later, with a halo acetyl halide such as, for example, chloracetyl chloride or any other halo acetyl halide, preferably diluted with an inert solvent such as, for example, dry ether or any other inert solvent, at a low temperature. The halo acetyl halide, dissolved in the inert solvent, is added gradually and the reaction mixture is allowed to stand for from thirty to forty-eight hours at room temperature. By this method the tertiary amine serves two purposes: first, it acts as a condensing agent in that it serves to remove from the sphere of reaction the halogen acid formed during the acetylation; in the example shown above, it removes hydrochloric acid, and secondly, it forms the quaternary ammonium group. A specific illustration of such a method is as follows:

I dissolve 124 parts (all parts are by weight) of diolein in a mixture of 300 parts of dry ethyl ether and 40 parts of dry pyridine. To this solution, chilled to zero degrees C. and maintained at this temperature, I add, gradually and with vigorous stirring, 40 parts of bromacetyl bromide dissolved in 200 parts of dry ethyl ether. I then cover this mixture to protect it from atmospheric moisture, allow it to come up to room temperature and let it stand two days at room temperature. I decant the supernatant liquid, discarding the residue. I now distill off the ether at low temperature, disperse the residue in 1000 parts of warm 2% sodium chloride solution and finally add 8% additional salt to throw out the product as a supernatant layer. I draw out the brine from under the supernatant layer and discard the brine. I then repeat the warm brine washing once more to remove further impurities, principally pyridine, and finally drive off the water at a low temperature from the supernatant layer. The product is a practically clear oil of straw color. While it has both hydrophile and lipophile groups, it is predominantly lipophile; has only very slight, if any "wetting-out" powers; has a very marked viscosity reducing effect on chocolate mixes, and is a very effective frying promoter for oleomargarine. This product may be represented by Example No. 28 indicated hereinabove.

I can use the same general method for the preparation of other substances of my invention, such as, for example, Nos. 2, 4, 5, 6, 10, 14, 15, 21, 23, 24, 26 and others although slight variations in the purification procedure may be applied if desired in instances where the physical characteristics of the product require it.

In preparing these compounds, I vary the proportions in accordance with the specific substances which I use, but in approximately the same ratio as shown by the above example.

The following table illustrates the principle of my method more specifically:

| No. of compound | Amount of lipin in dry ethyl ether (in parts) | Amount of nitrogenous base | Amount of halo acetyl halide in inert solvent |
|---|---|---|---|
| 2 | 48½ cetyl alcohol. 300 ether. | 40 pyridine. | 40 bromacetyl bromide in 200 dry ether. |
| 4 | 75 cholesterol. 450 ether. | do. | 40 bromacetyl bromide in 200 dry ether. |
| 5 | 75 cholesterol. 450 ether. | 62 dimethyl aniline. | 40 bromacetyl bromide in 200 dry ether. |
| 6 | 75 cholesterol. 450 ether. | 80 quinaldine. | 40 bromacetyl bromide in 200 dry ether. |
| 10 | 20 hexyl alcohol. 200 ether. | do. | 22 chloracetyl chloride. 200 dry ether. |
| 14 | 57 monolauryl di-ethylene glycol. 350 ether. | 40 quinaldine. | 22 chloracetyl chloride. 120 dry ether. |
| 15 | 81 monopalmityl di-glycerol. 500 ether. | 80 quinaldine. | 22 chloracetyl chloride. 120 dry ether. |
| 21 | 71 monostearine. 450 ether. | 80 pyridine. | 45 chloracetyl chloride. 200 dry ether. |
| 23 | 66 monocetyl di-ethylene glycol. 420 ether. | 80 quinaldine. | 40 bromacetyl bromide. 200 dry ether. |
| 24 | 41 alpha-alpha di-butyl ether of glycerine. 300 ether. | 40 pyridine. | 22 chloracetyl chloride. 150 dry ether. |
| 26 | 71 monostearine. 450 ether. | do. | 22 chloracetyl chloride. 150 dry ether. |
| 28 | 124 diolein. 700 ether. | do. | 40 chloracetyl bromide. 200 dry ether. |

I may vary the procedure in connection with the manufacture of similar compounds within certain limits to produce the same results. The methods of purification may also be varied within the skill of a synthetic organic chemist. I have found in practice that the halo acetyl halide dissolved in the inert solvent should be added slowly and gradually, with stirring and cooling, to the mixture of tertiary amine and lipin containing the free hydroxy group. In place of a halo acetyl halide, I may use the halo propionyl halide such as bromopropionyl bromide, and similar equivalent low molecular weight halo acyl derivatives.

In place of pure substances such as cetyl alcohol, oleic acid, palmitic acid, stearic acid, as intermediaries in the preparation of my lipophile substance, I may use mixtures such as fatty acids of corn oil or olive oil, acids of fish oils, or the like, which contain a large proportion of oleic acid, as well as many other fatty acids. I may also use mixtures of palmitic and stearic acids or mixtures of palmitic, stearic and myristic acids; in place of pure lauric acid I may use the fatty acids of coconut oil which contain about 40% of lauric acid. In place of pure cetyl alcohol I may use a mixture of cetyl alcohol and octadecyl alcohol which is obtained from spermaceti. In all cases, however, the general procedure is as outlined above.

What I claim as new and desire to protect by Letters Patent of the United States is:

1. A chemical compound having interface modifying functions and represented by the formula

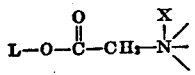

wherein "L" is a lipophile group of the class consisting of alkyls, ethers and esters, and having at least four carbon atoms, "X" is an anion, and "N" represents a pentavalent nitrogen with the three indicated valence bonds satisfied by radicals of the class consisting of alkyls, aryls, and the radical of a heterocyclic ring of which the nitrogen is a member.

2. A chemical compound having interface modifying functions and represented by the formula

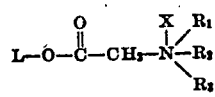

wherein "L" is an alkyl group with at least four carbon atoms, "X" is a halogen, and $R_1$, $R_2$, and $R_3$ are substantially non-lipophillic alkyl radicals, each of $R_1$, $R_2$, and $R_3$ containing less than four carbon atoms.

3. A chemical compound having interface modifying functions, and represented by the formula

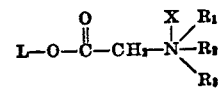

wherein "L" is a relatively high molecular weight ester of a polyhydroxy compound, "X" is a halogen, and $R_1$, $R_2$, and $R_3$ are substantially non-lipophillic alkyl radicals, each of $R_1$, $R_2$, and $R_3$ containing less than four carbon atoms.

4. A chemical compound having interface modifying functions and represented by the formula

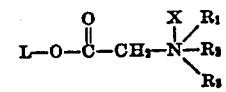

wherein "L" is a relatively high molecular weight ether of a polyhydroxy compound, "X" is a halogen, and $R_1$, $R_2$ and $R_3$ are substantially non-lipophillic alkyl radicals, each of $R_1$, $R_2$, and $R_3$ containing less than four carbon atoms.

5. A chemical compound having interface modifying functions and represented by the formula

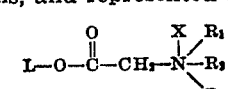

wherein "L" is a relatively high molecular weight fatty acid ester of a polyhydric alcohol, "X" is a halogen, and $R_1$, $R_2$, and $R_3$ are substantially non-lipophillic alkyl radicals, each of $R_1$, $R_2$ and $R_3$ containing less than four carbon atoms.

6. A chemical compound having interface modifying functions and represented by the formula

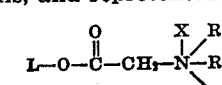

wherein "L" is a relatively high molecular weight ether of a polyhydric alcohol, "X" is a halogen, and $R_1$, $R_2$, and $R_3$ are substantially non-lipophillic alkyl radicals, each of $R_1$, $R_2$, and $R_3$ containing less than four carbon atoms 7. A chemical compound having interface modifying functions, and represented by the formula

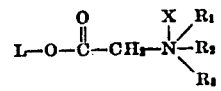

wherein "L" is a relatively high molecular weight fatty acid ester of glycerine, "X" is a halogen, and $R_1$, $R_2$, and $R_3$ are substantially non-lipophillic alkyl radicals, each of $R_1$, $R_2$, and $R_3$ containing less than four carbon atoms.

8. A chemical compound having interface modifying functions, and represented by the formula

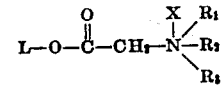

wherein "L" is a relatively high molecular weight ether of glycerine, "X" is a halogen, and $R_1$, $R_2$, and $R_3$ are substantially non-lipophillic alkyl radicals, each of $R_1$, $R_2$, and $R_3$ containing less than four carbon atoms.

9. A chemical compound having interface modifying functions, and represented by the formula

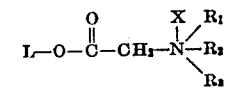

wherein "L" is a relatively high molecular weight fatty acid ester of a glycol, "X" is a halogen, and $R_1$, $R_2$, and $R_3$ are substantially non-lipophillic alkyl radicals, each of $R_1$, $R_2$, and $R_3$ containing less than four carbon atoms.

10. A chemical compound having interface modifying functions, and represented by the formula

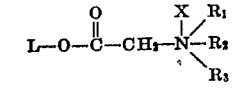

wherein "L" is a relatively high molecular weight ether of a glycol, "X" is a halogen, and $R_1$, $R_2$, and $R_3$ are substantially non-lipophillic alkyl radicals, each of $R_1$, $R_2$, and $R_3$ containing less than four carbon atoms.

11. A chemical compound having interface modifying functions, and represented by the formula

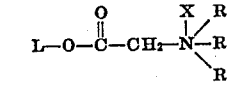

wherein "L" is a mono-fatty acid ester of a polyhydroxy substance, "X" is a halogen, and $R_1$, $R_2$, and $R_3$ are substantially non-lipophillic alkyl radicals, each of $R_1$, $R_2$, and $R_3$ containing less than four carbon atoms.

12. A pyridine derivative having interface modifying functions, and represented by the formula

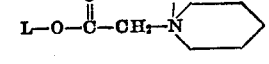

wherein "L" is a lipophile group with at least four carbon atoms, and "X" is a halogen.

13. A pyridine derivative having interface modifying functions, and represented by the formula

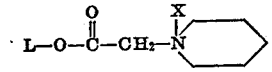

wherein "L" is a relatively high molecular weight ester of a polyhydroxy substance, and "X" is a halogen.

14. A pyridine derivative having interface modifying functions, and represented by the formula

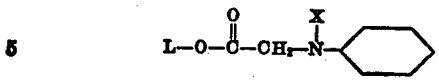

wherein "L" is a relatively high molecular weight ether of a polyhydroxy substance, and "X" is a halogen.

15. A pyridine derivative having interface modifying functions, and represented by the formula

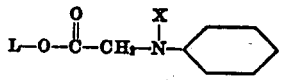

wherein "L" is a relatively high molecular weight fatty acid ester of a polyhydric alcohol, and "X" is a halogen.

16. A pyridine derivative having interface modifying functions, and represented by the formula

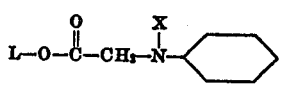

wherein "L" is a relatively high molecular weight ether of a polyhydric alcohol, and "X" is a halogen.

17. A pyridine derivative having interface modifying functions, and represented by the formula

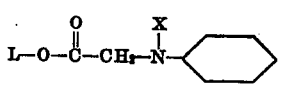

wherein "L" is a relatively high molecular weight fatty acid ester of a glycerine, and "X" is a halogen.

18. A pyridine derivative having interface modifying functions, and represented by the formula

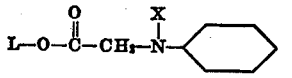

wherein "L" is a relatively high molecular weight ether of glycerine, and "X" is a halogen.

19. The substance

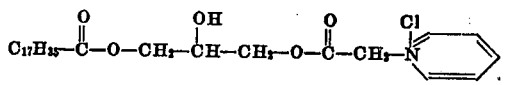

20. The substance

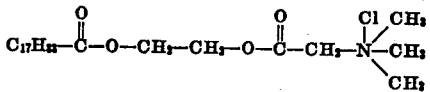

21. A chemical compound having interface modifying functions, and represented by the formula

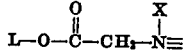

wherein "L" is a radical of a relatively high molecular weight ester of a polyhydroxy compound, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

22. A chemical compound having interface modifying functions, and represented by the formula

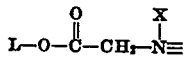

wherein "L" is a radical of a relatively high molecular weight ether of a polyhydroxy compound, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

23. A chemical compound having interface modifying functions, and represented by the formula

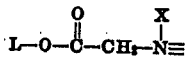

wherein "L" is a radical of a relatively high molecular weight fatty acid ester of a polyhydric alcohol, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

24. A chemical compound having interface modifying functions, and represented by the formula

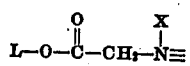

wherein "L" is a radical of a relatively high molecular weight ether of a polyhydric alcohol, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

25. A chemical compound having interface modifying functions, and represented by the formula

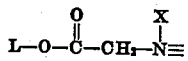

wherein "L" is a radical of a relatively high molecular weight fatty acid ester of glycerine, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

26. A chemical compound having interface modifying functions and represented by the formula

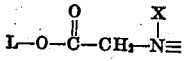

wherein "L" is a radical of a relatively high molecular weight ether of glycerine, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

27. A chemical compound having interface modifying functions, and represented by the formula

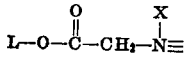

wherein "L" is a radical of a relatively high molecular weight fatty acid ester of a glycol, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

28. A chemical compound comprising interface modifying functions, and represented by the formula

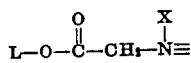

wherein "L" is a radical of a relatively high molecular weight ether of a glycol, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

29. A chemical compound having interface modifying functions, and represented by the formula

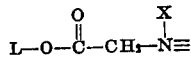

wherein "L" is a radical of a mono-fatty acid ester of a polyhydroxy substance, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

30. A pyridine derivative having interface modifying functions, and represented by the formula

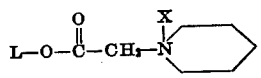

wherein "L" is a lipophile group with at least four carbon atoms, and "X" is an anion.

31. A chemical compound with interface modifying functions and having lipophile and hydrophile groups, said compound being represented by the formula

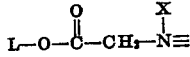

wherein "L" comprises the lipophile portion of the molecule and has at least 8 carbon atoms, "X" is an anion, and "N" represents a pentavalent nitrogen with the three indicated valence bonds satisfied by radicals of the class consisting of alkyl and aryl groups, and the radical of a heterocyclic ring of which the nitrogen is a member.

32. An ester with interface modifying properties with lipophile and hydrophile groups and represented by the formula

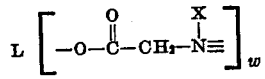

wherein "L" is the lipophile portion of the molecule with at least four carbon atoms, "X" is an anion, "w" is an integer and "N" represents a pentavalent nitrogen with the three indicated valence bonds satisfied by radicals of the class consisting of alkyl and aryl groups and the radical of a heterocyclic ring, of which the nitrogen is a member.

33. An ester with interface modifying properties for interfaces between aqueous media and non-aqueous media, with lipophile and hydrophile groups and represented by the formula

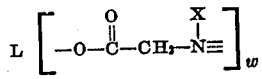

wherein "L" is the lipophile portion of the molecule with at least four carbon atoms, "X" is an anion, "w" is an integer and "N" represents a pentavalent nitrogen with the three indicated valence bonds satisfied by radicals of the class consisting of alkyl and aryl groups and the radical of the heterocyclic ring, of which the nitrogen is a member.

34. An ester with interface modifying properties for interfaces between aqueous media and non-aqueous media, with lipophile and hydrophile groups and represented by the formula

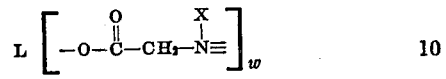

wherein "L" is the lipophile portion of the molecule with at least four carbon atoms, "X" is an anion, "w" is an integer, and "N" represents a pentavalent nitrogen with the three indicated valence bonds satisfied by radicals of the class consisting of non-lipophile alkyl radicals containing less than four carbon atoms and aryl groups, and the radical of the heterocyclic ring, of which the nitrogen is a member.

35. A betaine ester of an aliphatic alcohol having a lipophile radical with at least four carbon atoms.

36. A betaine ester of an aliphatic monohydric alcohol having at least four carbon atoms.

37. A betaine ester of a polyhydric alcohol wherein the hydrogen of a hydroxy group of the alcohol has its hydrogen replaced by a lipophile radical with at least four carbon atoms.

38. A betaine ester of a polyhydric alcohol wherein a hydroxy group of the alcohol is esterified with an aliphatic carboxylic acid having at least four carbon atoms.

39. A betaine ester of a polyhydroxy substance wherein at least two hydroxy groups of the polyhydroxy substance are esterified with aliphatic carboxylic acids having at least four carbon atoms.

40. A betaine ester of glycerine wherein the two remaining hydroxy groups of the glycerine are esterified with aliphatic carboxylic acids having at least four carbon atoms.

41. A chemical compound having interface modifying functions and represented by the formula

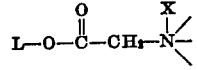

wherein "L" is a radical of the class consisting of alkyl ethers, and alkyl esters, said ethers and esters having at least four carbon atoms and having lipophile properties, "X" is an anion, and "N" represents a pentavalent nitrogen joined to carbons by the three indicated valence bonds.

42. A chemical compound having interface modifying functions and represented by the formula

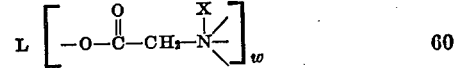

wherein "L" is a radical of the class consisting of lipophile alkyls, ethers, and esters, said alkyls, ethers, and esters having at least four carbon atoms, "X" is an anion, "N" represents a pentavalent nitrogen joined to carbon by the three indicated valence bonds, and "w" is a small integer.

43. The substance having the following formula

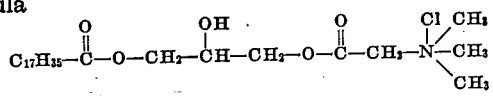

44. A chemical compound having interface modifying functions comprising a lipophile group containing at least four carbon atoms linked to the group

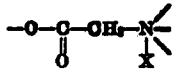

through a polyhydroxy substance, "X" being an anion, and the three indicated valence bonds of the "N" being satisfied by radicals of the class consisting of alkyls, aryls, and the radical of a heterocyclic ring of which the nitrogen is a member.

45. The compound of claim 44 wherein the polyhydroxy substance is of the class consisting of glycols, polyglycols, glycerol and polyglycerols.

BENJAMIN R. HARRIS.

Certificate of Correction

Patent No. 2,023,075. December 3, 1935.

BENJAMIN R. HARRIS

It is hereby certified that errors appear in the printed specification of the above numbered patent requiring correction as follows: Page 2, first column, line 35, strike out formula number 10 and insert instead the following:

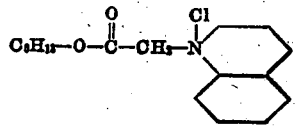

page 7, first column, lines 5, 15, 22, 32 and 40, claims 14, 15, 16, 17 and 18 respectively, strike out the formula and insert instead the following:

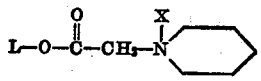

and that the said Letters Patent should be read with these corrections therein that the same may conform to the record of the case in the Patent Office.

Signed and sealed this 1st day of September, A. D. 1936.

[SEAL]

LESLIE FRAZER,
*Acting Commissioner of Patents.*